J. A. OSBORN.
TRAVELING ELECTRIC WELDING APPARATUS.
APPLICATION FILED MAR. 18, 1911.
1,042,466.
Patented Oct. 29, 1912.
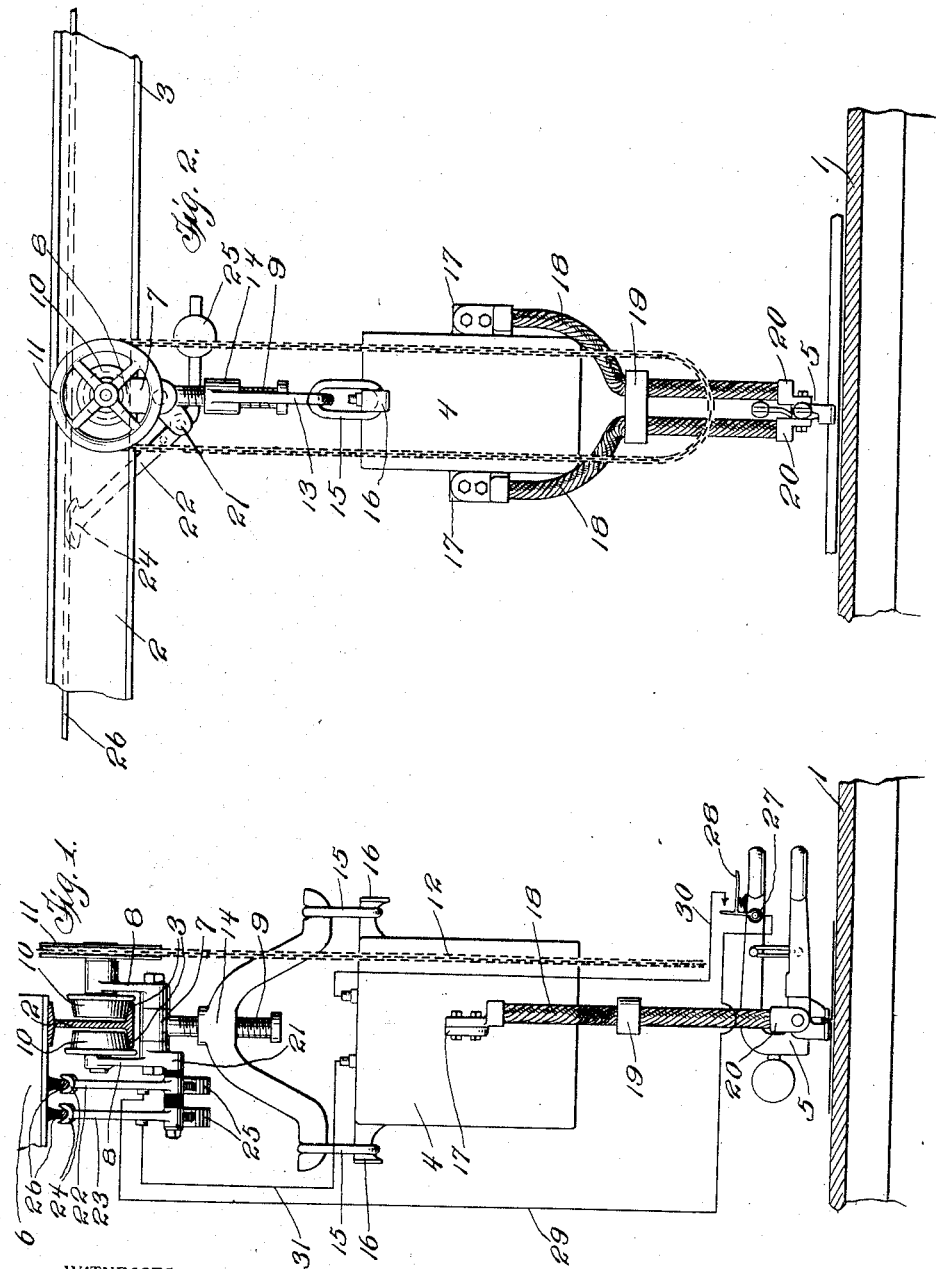

UNITED STATES PATENT OFFICE.

JOSEPH A. OSBORN, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

TRAVELING ELECTRIC WELDING APPARATUS.

1,042,466. Specification of Letters Patent. Patented Oct. 29, 1912.

Application filed March 18, 1911. Serial No. 615,401.

*To all whom it may concern:*

Be it known that I, JOSEPH A. OSBORN, residing at 915 Olive street, St. Louis, Missouri, and being a citizen of the United States, have invented certain new and useful Improvements in Traveling Electric Welding Apparatus, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a side elevational view of a device constructed in accordance with my invention, the supporting medium thereof being shown in transverse section. Fig. 2 is a view similar to Fig. 1, but being taken at right angles thereto.

The object of this invention is to provide a simple device for supporting an electric welding tool at a predetermined position relative to the work upon which said tool is adapted to operate, and further to so support said tool that the same may be caused to travel along the work, at the will of the operator.

Since it is found desirable that the low tension current, supplied to the tool, should be conducted thereto, through conductors of great capacity and of as short length as possible, a further object of the invention is to support the transformer that is the source of supply of said low tension current, in close proximity to said tool and to adapt said transformer to travel bodily with said tool. The necessity for lengthy secondary conductors is thus avoided.

A further object is to provide a means whereby the tool may be lifted or lowered relative to the work, and a final object is to provide a means for conducting the primary current to the moving transformer and to provide a switch, operatable at the will of the workman, to control the passage of the primary current through the transformer.

Referring to the drawings by numerals, 1 indicates a table or other suitable support upon which the work is adapted to rest, 2 a horizontally disposed beam formed with oppositely projecting continuous lower flanges 3—3, and 4 the transformer, and 5 the welding tool.

The beam 2 may be suspended from any suitable support as 6, and the flanges 3—3 thereof are disposed so as to be parallel throughout their length with upper surface of the table 1. A carriage 7, comprising the upstanding arms 8—8 and the pendent screw threaded lug 9 is supported upon the flanges 3— by suitable rollers or wheels as 10—10, said flanges forming a runway along which the wheels 10 are adapted to travel. The wheels 10 are rotatably mounted at the upper ends of the arms 8 upon the suitable short shafts. The shaft of one of said wheels is extended through the bearing at the upper end of the adjacent arm 8 and to the outer end of said shaft is fixed a chain-wheel 11. An endless chain 12 is fitted in the groove of the wheel 11 and hangs loosely downward so that the long portion thereof may be within easy reach of the operator whereby he may revolve the wheel 11, and with it the roller 10 and cause the carriage 7 to travel along the length of the beam 2.

A yoke 13, formed with an internally screw threaded sleeve as 14, is fitted upon the pendent lug 9 and the oppositely disposed arms of said yoke carry, at their ends, a pair of links as 15—15 and said links in turn, engage outstanding ears 16—16 formed upon opposite sides of the transformer 4 and serve to detachably support said transformer upon said yoke.

Laterally projecting ears 17 are formed upon opposite sides of the transformer 4 and the secondary conductors 18—18 are electrically connected to said ears and depend therefrom as is clearly indicated in the drawings. Immediately below the transformer the conductors 18 are brought relatively closer together and are held by a suitably insulated tie member as 19. Below the tie 19, the remaining portions of the length of the conductors are disposed parallel and of a distance apart equal to the distance apart of the terminals 20—20 formed, upon the tool 5, with which they are adapted to engage.

The specific details of construction of the tool are of no particular importance in the present application. Any suitable or preferred construction of tool may be employed in connection with this device as for instance that illustrated in my co-pending application Serial No. 615,403. It will be understood, however, that the opposite poles or jaws of the tool must be thoroughly insulated and that the current from one of the secondary conductors 18 will enter one of the jaws of the tool and that, when the jaws are brought into proper contact with the article to be welded, the current will pass from said jaw into the opposite jaw and thence through the other conductor 18 back to the transformer. The passage of the current from one jaw to the other, through the work, will be sufficient to cause the two elements, usually comprising said work, to be fused, and thus become securely bound together.

Formed upon the carriage 7 is a laterally projecting ear as 21 adapted to pivotally support a pair of insulated trolley poles as 22 and 23. These poles are formed with suitable contacts shoes 24, at their upper ends, and with adjustable weights 25 at their lower ends, beyond the pivots. The shoes 24 are adapted to engage feed wires 26—26, and the weights 25 are employed as a means of maintaining the engagement of shoes with said wires.

It is desirable that the operator may have convenient control of the current entering the primary coil of the transformer and to this end the invention comprises a switch of any approved form which may be attached to the handle of the tool as at 27. The switch is preferably provided with a hand piece 28, which may be conveniently pressed by the operator when it is desired that the current shall be supplied to the transformer.

The current entering the trolley pole 22 from the adjacent feed wire 26 will pass along the wire 29 to one side of the switch at 27. From the opposite pole of the switch the current will pass along the wire 30 through the primary coil of the transformer, thence along wire 31 to the trolley pole 23 and thence into the opposite feed wire 26. The induced current thus set up in the transformer, will flow through the secondary conductors 18 and through the tool as already described.

When it is desired to move the tool to a greater or less distance above the surface of the table it is simply necessary to turn the supporting yoke 13, with the attached parts, bodily around the lug 9 so that the screw threaded connection between the sleeve 14 and said lug will be brought into operation, the connecting wires 29 and 31 being of sufficient length to permit such movement of the parts.

Having thus described my invention what I claim as new and desire to secure by Letters Patent is:—

1. In an electric welding apparatus, a runway, a transformer suspended from and being adapted to be moved along said runway, a tool flexibly carried by the secondary circuit cables, and means carried by said tool for controlling the flow of current through said transformer.

2. In an electric welding apparatus, a runway, a transformer suspended from and being adapted to be moved along said runway, a tool flexibly carried by the secondary circuit cables, a pair of trolley wires, and means movable with said transformer adapted to take current from said trolley wires and to conduct said current through said transformer.

3. In an electric welding apparatus, a runway, a transformer supported from and being adapted to be moved along said runway, a tool supported from said transformer, a pair of trolley wires, means movable with said transformer adapted to take current from said trolley wires for said transformer, and means carried by said tool for controlling the flow of said current through said transformer.

4. In an electric welding apparatus, a runway, a transformer supported from and being adapted to be moved along said runway, a tool supported from said transformer, a pair of trolley wires, means movable with said transformer adapted to take current from said trolley wires for said transformer, and means carried by said tool for controlling the flow of current through said transformer.

5. In an electric welding apparatus, a runway, a carriage movable along said runway, a transformer suspended from said carriage, a tool flexibly carried by the secondary circuit cables, and means for adjusting said transformer and tool relative to said carriage.

6. In an electric welding apparatus, the combination with a runway, of a work table disposed parallel with said runway, a transformer suspended from and movable along said runway, a tool flexibly carried by the secondary circuit cables, and means for supporting said transformer and tool relative to said table.

7. In an electric welding apparatus, a runway, a carriage movable along said runway, a transformer supported beneath said carriage, and a tool flexibly carried by the secondary circuit cables, a chain wheel for moving said carriage, and a chain engaging said wheel and extending into proximity with said tool.

8. In an electric welding apparatus, a runway, a carriage movable along said runway, a transformer supported beneath said carriage, and a tool flexibly carried by the secondary cables, a drive wheel for moving said carriage, and operating means for said drive wheel, said operating means extending into proximity with said tool.

9. In an electric welding apparatus, a runway, a carriage movable along said runway, a screw threaded lug formed upon said carriage, a transformer, means connected with said transformer adapted to engage the threads of said lug whereby rotation of said transformer relative to said carriage will move said transformer relative to said runway, and a tool supported from said transformer.

10. In an electric welding apparatus, a runway, a carriage movable along said runway, a screw threaded lug formed upon said carriage, a yoke formed with means adapted to engage the threads of said lug whereby rotation of said yoke relative to said lug will move said yoke relative to said runway, a transformer detachably connected to and supported from said yoke, and a tool connected to and supported from said transformer.

11. In an electric welding apparatus, a runway, a carriage movable along said runway, a pair of feed wires adjacent said runway, means carried by said carriage adapted to take current from said feed wires for said transformer, a tool supported from said transformer, and means carried by said tool for controlling the flow of said current, the supporting means between said transformer and tool serving as conductors of the secondary current between the transformer and tool.

In witness whereof I have hereunto set my hand in the presence of two witnesses.

JOSEPH A. OSBORN.

Witnesses:
CHARLOTTE E. MITZE,
J. H. BRUEGGEMAN.